United States Patent [19]

Roy, III et al.

[11] Patent Number: 5,546,090
[45] Date of Patent: Aug. 13, 1996

[54] METHOD AND APPARATUS FOR CALIBRATING ANTENNA ARRAYS

[75] Inventors: Richard H. Roy, III, Cupertino, Calif.; David M. Parish, Amherst, N.Y.; Craig H. Barratt, Redwood City, Calif.; Chinping Q. Yang; John T. Orchard, both of Palo Alto, Calif.

[73] Assignee: Arraycomm, Inc., Santa Clara, Calif.

[21] Appl. No.: 234,747

[22] Filed: Apr. 28, 1994

Related U.S. Application Data

[63] Continuation-in-part of Ser. No. 806,695, Dec. 12, 1991.

[51] Int. Cl.⁶ .............................. G01S 13/74; G01S 7/40
[52] U.S. Cl. .................... 342/174.000; 342/50; 342/51; 342/42
[58] Field of Search .................... 342/42, 44, 50, 342/51, 174

[56] References Cited

U.S. PATENT DOCUMENTS

| | | | |
|---|---|---|---|
| 4,316,191 | 2/1982 | Sawatari et al. | 342/91 |
| 4,855,748 | 8/1989 | Brandao et al. | 342/455 |
| 5,041,833 | 8/1991 | Weinberg | 342/357 |
| 5,255,210 | 10/1993 | Gardner et al. | 364/574 |
| 5,274,844 | 12/1993 | Harrison et al. | 364/378 X |
| 5,299,148 | 3/1994 | Gardner et al. | 342/378 X |
| 5,379,320 | 1/1995 | Fernandes et al. | 375/1 |
| 5,387,915 | 2/1995 | Moussa et al. | 342/40 |

*Primary Examiner*—John B. Sotomayor
*Attorney, Agent, or Firm*—Townsend & Townsend & Crew LLP; Henry K. Woodward

[57] ABSTRACT

A method and apparatus for calibrating antenna array systems comprising of a portable transponder (118) and a calibration processor (124). Calibration processor (124) generates calibration transmit signals which it transmits using transmit signal processor (104) and antenna array (111). Transponder (118) echoes these signals back and they are acquired by calibration processor (124) through antenna array (111) and receive signal processor (106). Calibration processor (124) processes the received signals to calculate antenna calibration vector (102).

29 Claims, 7 Drawing Sheets

5,546,090

METHOD AND APPARATUS FOR CALIBRATING ANTENNA ARRAYS

CROSS REFERENCES TO RELATED APPLICATIONS

The application is a continuation-in-part of application Ser. No. 07/806,695, filed Dec. 12, 1991, for Spatial Division Multiple Access Wireless Communication Systems now allowed.

BACKGROUND OF THE INVENTION

This invention relates to radio frequency antenna arrays and, more particularly, the invention relates to calibrating radio frequency transceiver systems including antenna arrays to maximize their performance and effectiveness.

Antenna arrays can be used in any type of system that transmits or receives radio frequency signals using an antenna or antennas. Examples of such systems are radio communication systems, radars, and certain medical systems that employ radio frequency signals. The use of antenna arrays in such systems provides for antenna performance improvements over the use of a single element antenna, including improved directionality, signal to noise ratio, and interference rejection for received signals, as well as improved directionality, security, and reduced power requirements for transmitted signals. Antenna arrays can be used for signal reception only, for signal transmission only, or for both signal reception and transmission. Most antenna array systems consist of an antenna array and a signal processor that processes the signals going to and coming from the individual array elements.

Originally, manufacturers of antenna array systems used signal processors that assumed ideal antenna arrays. Great care was taken in designing and manufacturing the antenna arrays to ensure that the signal characteristics of the array were as close to ideal as possible. As a result, these antenna arrays were very difficult and expensive to manufacture.

Modern antenna array systems include a provision for storing and using calibration vectors that document the actual signal characteristics of the array. The signal processors for these systems use the calibration vectors to compensate for performance variances of the actual signal characteristics of the array. Unfortunately, conventional methods for measuring array calibration vectors have many drawbacks, including the requirement for extensive external measuring equipment which is both unwieldy and expensive. Further, conventional calibration methods are sensitive to drifts in system parameters such as frequency references over the extended period of time during which measurements are being made, and these drifts lead to inaccuracies in the measured antenna calibration vector.

Consequently, many antenna arrays are assigned generic calibration vectors for their particular design. Other antenna arrays are calibrated only once in the factory or upon initial installation. Conventional array calibration methods are sufficiently time consuming that it is impractical to calibrate an array at multiple angles or on a routine basis. Accordingly, antenna arrays that have not been individually and recently calibrated in their current environment will have inaccuracies in their array calibration vectors which result in performance degradation.

SUMMARY OF THE INVENTION

An object of the present invention is an improved method and apparatus for calibrating an antenna array without the requirement for expensive and unwieldy calibration instruments.

Another object of the invention is a calibration method and apparatus that minimizes the time required to measure an antenna array calibration vector.

Still another object of the invention is a method and apparatus for calibrating an antenna array system that can be easily used at an installation site.

Another object of the invention is calibration apparatus that can be readily implemented in a radio frequency system and allow frequent antenna array calibration.

Briefly, a calibration system in accordance with the invention comprises an antenna array including a plurality of antennas for transmitting a first plurality of signals and for receiving a second plurality of signals. Signal processing means generates the first plurality of signals and receives and individually separates the second plurality of signals. Transponder means is positioned in the field of the transmitted first plurality of signals for receiving the signals and in response thereto retransmitting the second plurality of signals back to the antenna array. The second plurality of signals as received by the antenna array is then applied to the signal processing means which separates the signals into individually identifiable second signals associated with individual antennas. The individually identifiable signals are then analyzed in conjunction with the first transmitted signals to produce transmit calibration vectors and receive calibration vectors which can be defined as the relative phase and amplitude of identical signals transmitted or received through the antenna array elements.

In one embodiment, all elements of an antenna array transmit and receive RF signals, while in another embodiment the antenna array includes first antenna elements for transmitting RF signals and a second plurality of elements for receiving RF signals.

The individually identifiable signals can be made identifiable by changes in frequency, by time, or by modulation.

The invention and objects and features thereof will be more readily apparent from the following detailed description and appended claims when taken with the drawings.

DETAILED DESCRIPTION OF THE ILLUSTRATIVE EMBODIMENTS

Figure 1:
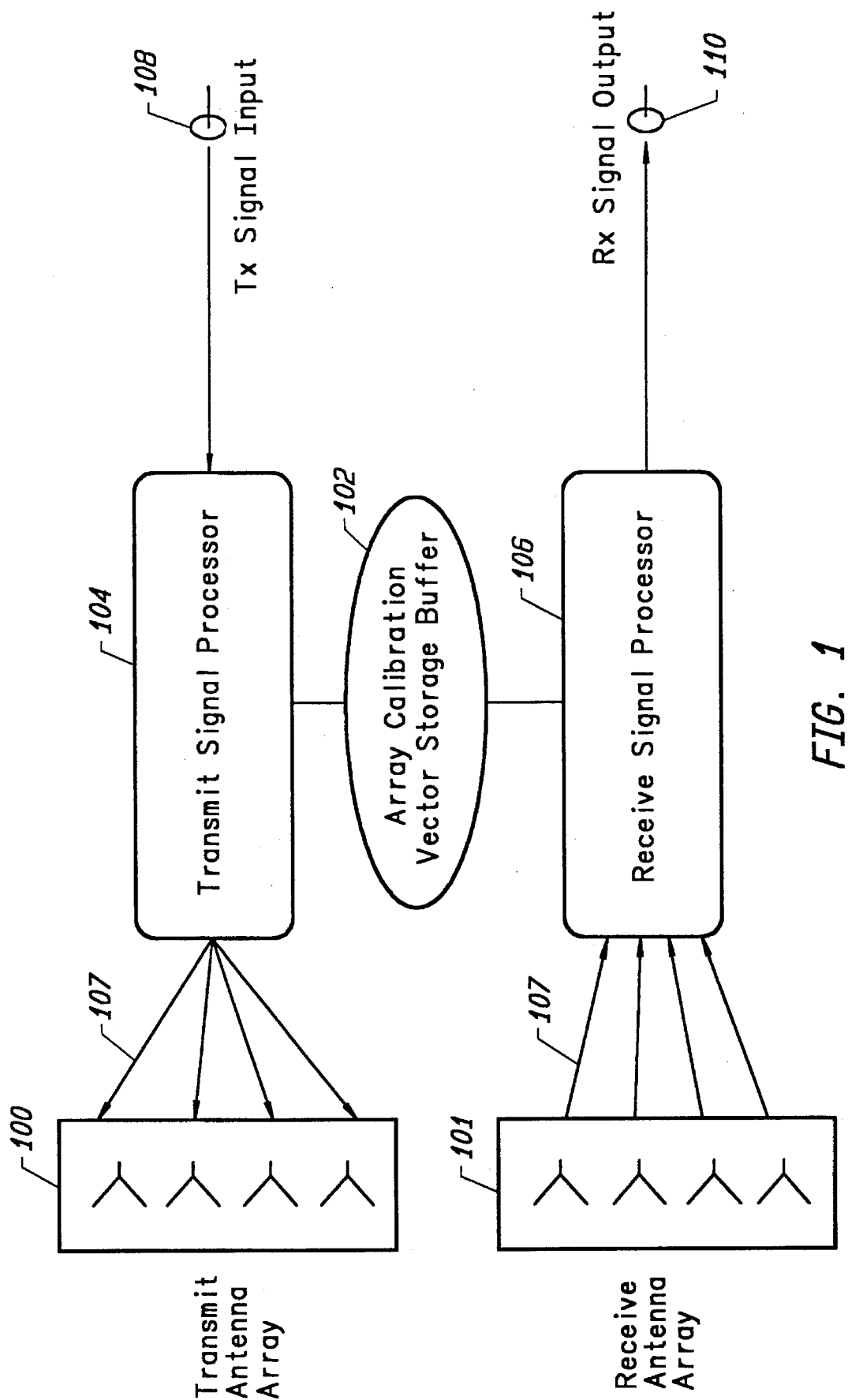
FIGS. 1 and 2 illustrate conventional RF signal transceiver systems employing antenna arrays.
Figure 2:
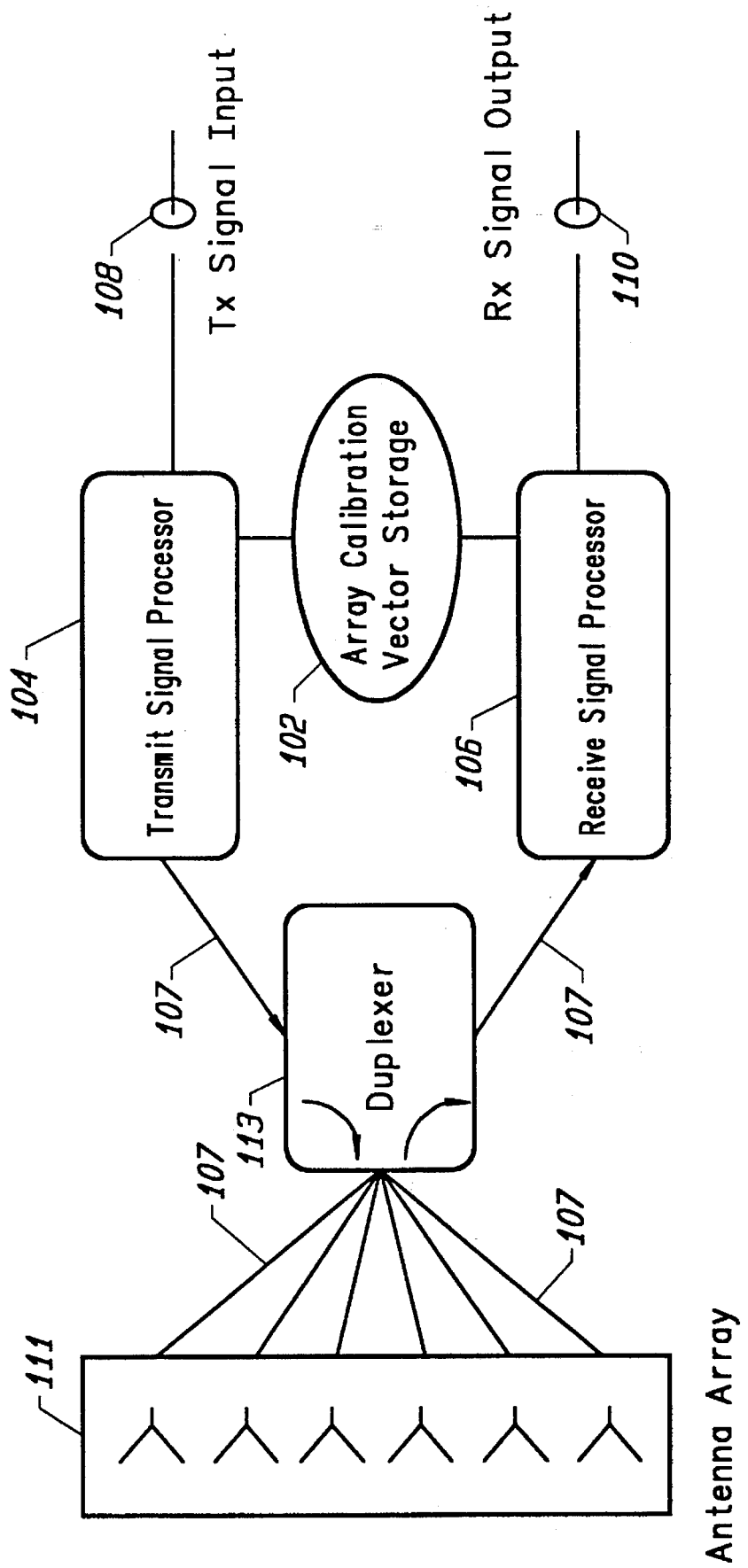

Referring now to the drawings, FIGS. 1 and 2 illustrate conventional RF signal transceiver systems including antenna arrays. In FIG. 1 an antenna array system is configured with separate antennas for signal transmission and reception. The antenna array system consists of a transmit antenna array 100, a receive antenna array 101, a transmit signal processor 104, a transmit signal input 108, a receive signal processor 106, and a receive signal output 110. Transmit antenna array 100 and receive antenna array 101 need not have the same number of elements and either might have only a single element. Transmit and receive signal processor 104 and 106 can be implemented using analog electronics, digital electronics, or a combination of the two. Signal processors may be static (always the same), dynamic (changing depending on desired directivity), or smart (changing depending on received signals).

Unfortunately, due to normal manufacturing variance in the construction of antenna arrays 100 and 101, cables 107, and other effects, identical signals passing through the different elements of antenna arrays 100 and 101 will emerge with different amplitudes and phases. Similarly, identical signals passing through different channels in signal processors 104 and 106 will be altered in amplitude and phase. Cables 107 connected to different elements of antenna arrays 100 and 101 will also be different from one another. Since the above subsystems 100,101,104,106, and 107 are all accurately modeled as linear systems, the amplitude and phase changes caused by each subsystem at any specific frequency can be lumped together into a single composite amplitude and phase calibration number for each antenna element. These composite amplitude and phase calibration numbers form an array calibration vector. Since the signals for transmit and receive follow somewhat different hardware paths, the system will have both a transmit and a receive array calibration vector for each frequency of interest. These particular calibration vectors are stored in an array calibration vector storage buffer 102 and are the RF hardware related components of the more general array manifold vector which also includes the effects of the geometry of RF propagation.

FIG. 2 shows an antenna array system similar to that in FIG. 1, like elements have the same reference numbers. However, a single antenna array 111 is used for both transmit and receive. A radio frequency duplexer 113 is connected between antenna array 111 and signal processors 104 and 106. Array calibration vector storage 102 now contains composite phase and amplitude calibration values for antenna array 111, signal processors 104 and 106, cables 107, and duplexer 113. As above, these are the instrument dependent components of the array manifold vectors. The calibration method for calibrating antenna arrays in accordance with the invention can be applied to most antenna array systems including both that shown in FIG. 1 and that shown in FIG. 2.

The degree to which an antenna array system provides antenna performance improvements over a single element antenna depends upon the geometry of antenna array 111 and the sophistication of signal processors 104 and 106. Antenna performance improvements also depend upon the accuracy of array calibration vectors stored in storage buffer 102. Array calibration vectors will vary depending on the geometry of array 111, the construction of array 111 and signal processors 104 and 106, the exact frequency of transmission and reception, and the environment in which antenna array 111 is placed. All of these characteristics may change from one antenna array to the next and over time for any particular antenna array 111. Environmental factors which will affect array calibration vectors stored in buffer 102 include the location of any solid or liquid objects, especially metal, within a distance of approximately ten times the size of antenna array 111, and the ambient temperature. In certain environments, array calibration vectors may change as a function of position with respect to antenna array 111. These position-dependent calibration vectors can be measured and separately stored, or can be used to compute one calibration vector referenced to a nominal or standard position.

Figure 3:
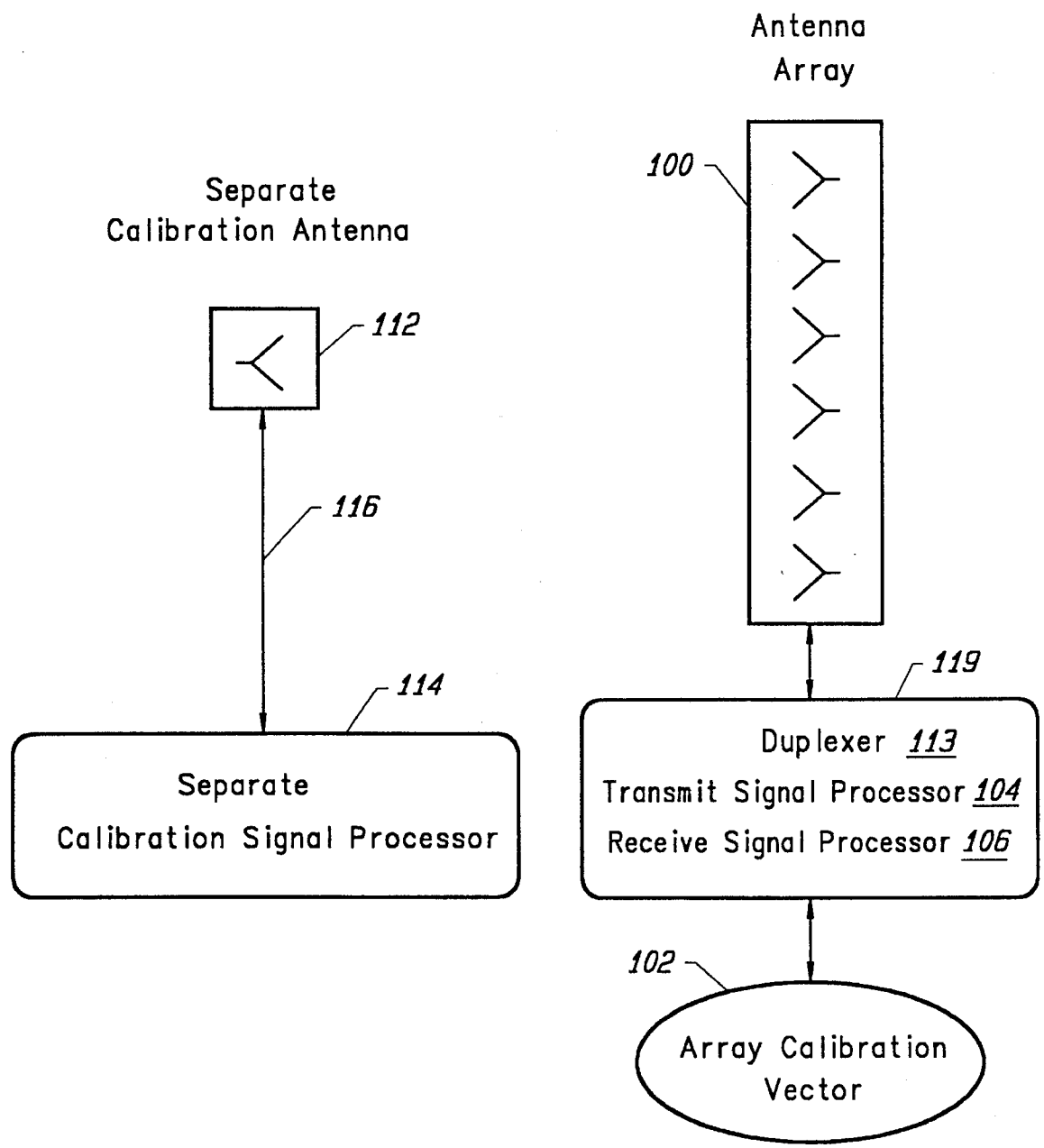
FIG. 3 illustrates a calibration system for an antenna array system in accordance with the prior art.

FIG. 3 shows apparatus for a conventional array calibration. A separate calibration antenna 112 and a separate calibration processor 114 are used to measure array calibration vectors stored in storage-buffer 102. Separate calibration antenna 112 must be located in the far field of the array and must be attached to separate calibration processor 114 using a cable 116. For simplicity, transmit signal processor 104, receive signal processor 106 and duplexer 113 from FIG. 2 have been grouped together as a single signal processor block 119 in FIG. 3. In order to measure array calibration vector 102 at a number of positions with respect to antenna array 111, calibration antenna 112 and calibration processor 114 must be moved to different positions in the field of the array.

Figure 4:
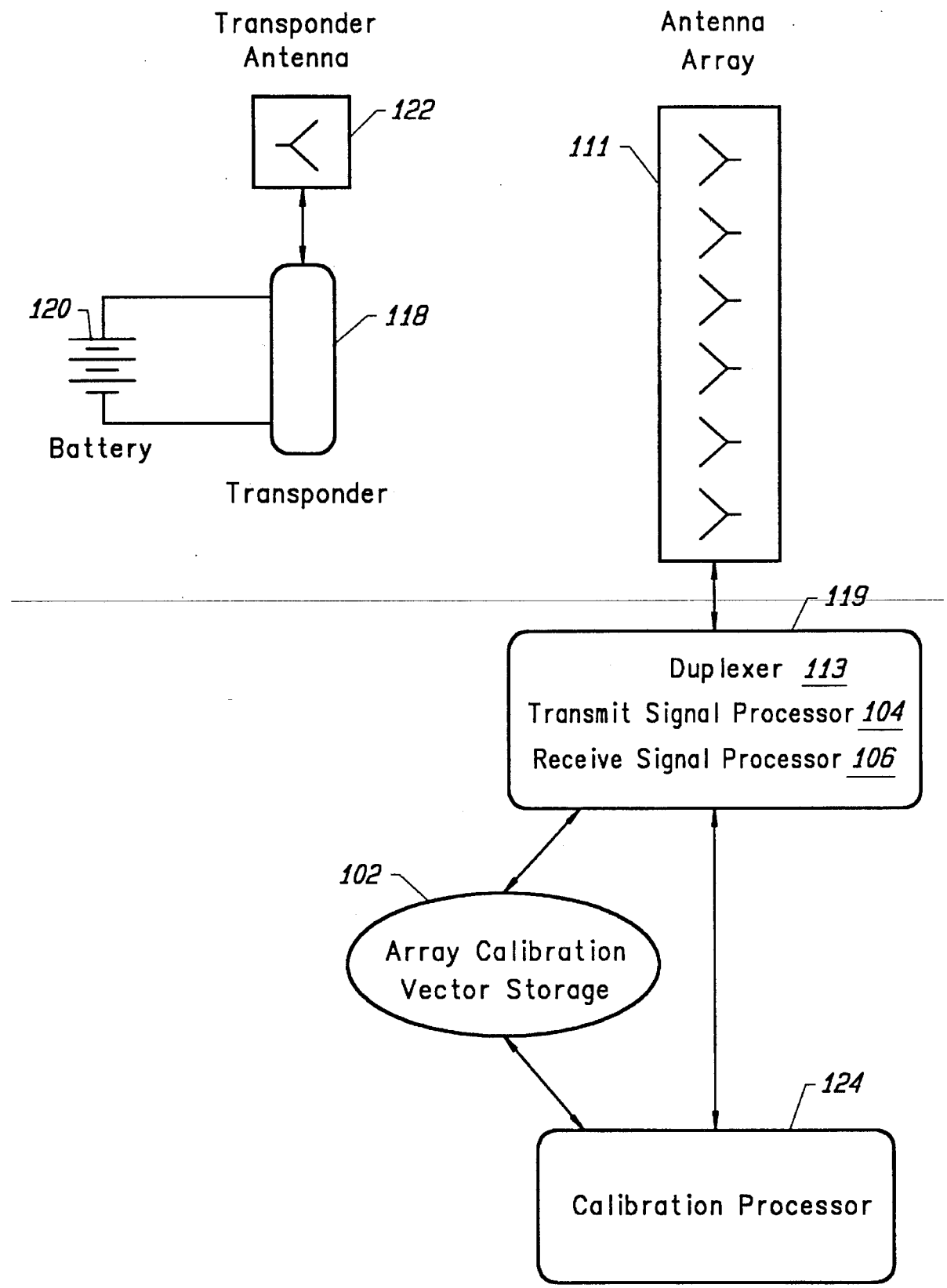
FIG. 4 is a functional block diagram illustrating an antenna calibration system in accordance with one embodiment of the invention.

Consider now FIG. 4 which shows a block diagram of a preferred embodiment of the transponder based calibration apparatus and method in accordance with the invention. Antenna array 111 is connected to array signal processors 104 and 106. Array 111 may be any antenna array that allows connection of separate signal lines for each antenna element in the array. Signal processors 104 and 106 can be analog in nature, digital in nature, or partly analog and partly digital. The primary requirement of signal processors 104 and 106 are that they must be able to independently alter the phase and amplitude of the signals being transmitted and/or received from the individual antenna array elements. An example of such a signal processing subsystem is described in co-pending patent application Ser. No. 07/806,695, supra.

Array signal processors 106 and 104 are connected to array calibration vector storage buffer 102 and also to a calibration processor 124. Like array signal processors 104 and 106, array calibration vector storage buffer 102 and calibration processor 124 can be implemented in analog hardware, digital hardware or in software. In the preferred embodiment described herein, array signal processors 104 and 106, array calibration vector storage buffer 102 and calibration processor 124 are all implemented in software. A simple, portable transponder 118 with its own transponder antenna 122 are used in place of the conventional separate calibration processor 114 and separate calibration antenna 112.

Figure 5:
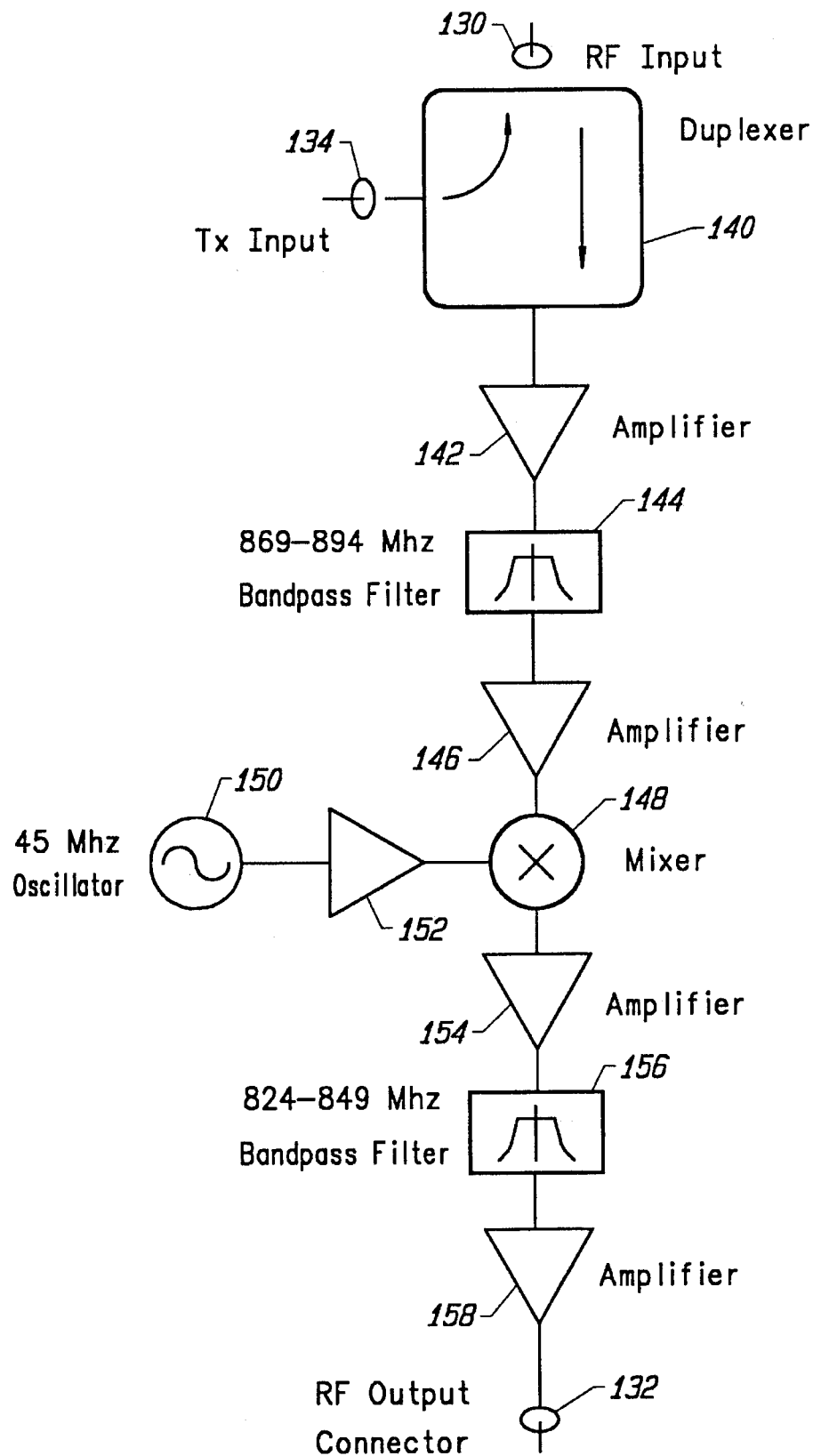
FIG. 5 is a more detailed functional block diagram of the transponder in the system of FIG. 4.

Frequency shifting transponder 118 is powered by a 12 volt battery 120 and can use a single antenna 122 for both transmit and receive. FIG. 5 shows a schematic diagram of the transponder circuit. The transponder is housed in an aluminum box with lids on the bottom and top that complete a radio frequency shield when installed. A radio frequency input connector 130, a radio frequency output connector 132 and a transmit input connector 134 are SMA connectors standard to radio frequency engineering. Power enters the case through a feedthrough filter. Receive radio frequency input 130 and transmit input 134 are connected to a radio frequency duplexer 140 (Part No. DFY2R836CR881BHA, Murata Erie Corporation, Smyrna, Ga.). Duplexer 140 has its output feeding the input of a MAR-6 radio frequency amplifier 142 (Mini Circuits Inc, Brooklyn, N.Y.). Amplifier 142 output is then connected to a 869–894 MHz passband standing acoustic wave filter 144 (Part No. TQS-730A/B-7R, Toyocom communication Equipment Co., Tokyo, Japan). Filter 144 output is connected to another MAR-6 amplifier 146 and then goes into a mixer 148. The other input to mixer 148 is supplied by a 45 MHz crystal oscillator 150 via a MAR-6 amplifier 152. Mixer 148 output is connected to another MAR-6 amplifier 154. Amplifier 154 output goes to another filter 156 (Toyocom TQS-729A/B-7R) which has a passband from 824–849 MHz. Filter 156 output is connected to a MSA-1104 amplifier 158 (Hewlett Packard, Inc., Palo Alto, Calif.) and then goes to RF output connector 132. In this embodiment, RF output connector 132 is connected via a cable to Tx input 134. In other embodiments, RF output connector 132 is connected to a separate transmit antenna element.

Figure 6:
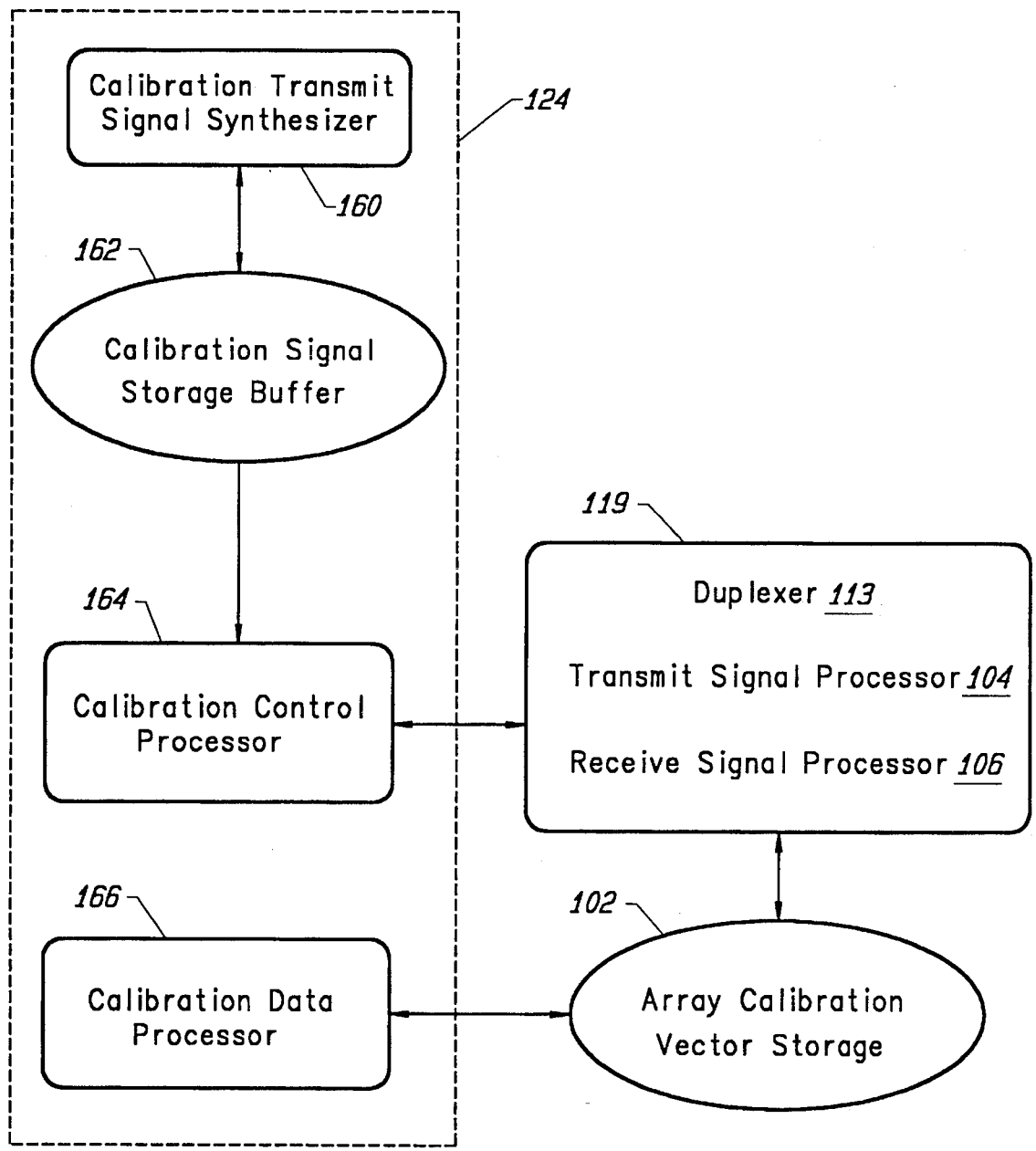
FIG. 6 is a functional block diagram of one embodiment of the calibration processor of FIG. 4.

The calibration processor 124 of FIG. 4 is shown in more detail in FIG. 6. A calibration transmit signal synthesizer 160 is connected to a calibration signal storage buffer 162, and a calibration control processor 164 is connected to calibration signal storage buffer 162 and to array signal processors 104 and 106. Calibration control processor 164 is also connected to a calibration data processor 166. In the preferred embodiment, calibration data processor 166 is implemented in software; however, it can also be implemented in digital or analog hardware. As shown in more detail in FIG. 7, calibration data processor 166 includes a receive calibration processor 170, an offset frequency estimator 174 for providing an offset frequency estimate 176, an offset frequency compensator 178, and a transmit calibration processor 182.

Refer again to FIG. 4 which shows an overview of an antenna array system employing the transponder based method for antenna array calibration. In operation, calibration processor 124 generates a specialized calibration transmit signal which it transmits from the array through the duplexer using the transmit signal processor 104. Transponder 118 receives the calibration transmit signal and echoes it back with the appropriate changes so that it will be received by receive signal processor 106 through the duplexer. In the illustrative embodiment, the radio system uses different frequencies for transmit and receive. Thus, the transponder echoes back a signal that is a frequency shifted copy of the signal it receives. However, for a system that uses time division duplexing, the transponder would echo back a copy of the signal shifted to a different time slot. Similarly, in a code division multiple access system using a plurality of spreading functions, the transmit and receive frequencies are separated by a fixed frequency offset, so the transponder will echo back the signal with a frequency shift. Calibration processor 124 then acquires the echoed calibration signal through a receive signal processor 106 and uses this received calibration signal along with knowledge of the transmit calibration signal to calculate array calibration vectors which are then stored in array calibration vector storage buffer 102.

In this embodiment, the function of transponder 118 is to receive a signal in the range of 869 to 894 MHz, down-convert it by 45 MHz, filter it to select only a narrow frequency band, amplify it, and then re-transmit it as a signal in the 824 to 849 MHz range. As mentioned above, frequency shifting transponder 118 is only one possible example of a transponder that can be used for our transponder based calibration method. The only general requirement for transponder 118 is that it transmit back a radio frequency signal that is somehow distinguishable from the signal it received. Besides frequency shifting the signal, transponder 118 could instead time delay the signal, or more generally modulate it with various well-known modulation schemes.

As shown in FIG. 5, receive radio frequency input 130 passes signals between transponder 118 and transponder antenna 122. In the preferred embodiment, radio frequency duplexer 140 separately routes signals coming from transmit input 134 out to transponder antenna 122. Radio frequency duplexer 140 routes signals coming from transponder antenna 122 to amplifier 142 which amplifies the received signal by 17 db. This amplified signal is then filtered by filter 144 which eliminates unwanted signals based on their frequencies. This filtered signal is then further amplified by another 17 db by amplifier 146.

Crystal 150 provides 45 MHz reference signal for the down conversion process. This signal is also amplified by 17 db by amplifier 152. Mixer 148 combines the signals from amplifier 152 and amplifier 146 producing two new signals at frequencies 45 MHz above and 45 MHz below the original 864–894 MHz radio frequency input frequency. These two new signals are amplified by 17 db by amplifier 154. Filter 156 eliminates the upper mixer product, leaving only the lower mixer product which has a frequency of 824–849 MHz but is in all other respects a copy of the original input signal on radio frequency input 130. Amplifier 158 amplifies this frequency shifted signal by another 11 db before it is presented on RF output connector 132. In this embodiment, RF output connector 132 is connected via cable to Tx input 134. In other embodiments, RF connector 132 can be connected to a separate transmit antenna element.

The transponder described above is designed to shift and transpond all of the channels in the North American Cellular band. In some circumstances it might be desirable to transpond only a single narrow band communication channel. Since most single channel communication bandwidths are too narrow for practical filters at RF frequencies, such a single channel transponder would mix the RF frequency down to a lower intermediate frequency, apply a narrow band filter at this intermediate frequency, and then mix the filtered signal back up to the desired RF frequency for echoing. In all other aspects, the narrow band, single channel, transponder would behave and be constructed like the broad band transponder described here.

The calibration transmit signal synthesizer 160 in calibration processor 124 (FIG. 6) generates a set of signals that are used for calibration. The calibration transmit signal synthesizer generates a signal, $S_i$, for each of the m antenna array elements. In one embodiment, the signals $S_i$ are complex sine waves generated and stored digitally as follows:

$$S_i(t) = \exp(j\omega_i t), \tag{1}$$

$t = 1, \ldots, n$. The frequencies are $$\omega_i = \frac{2\pi p}{n} i, \tag{2}$$

$i = 1, \ldots, m$, p is a positive integer and n is the number of sample points to use, 2048 in the current embodiment of the invention. The transmit signal $S_{tx}$ is now a matrix whose m columns are the signals $S_1$ through $S_m$. The output of calibration transmit signal synthesizer 160, $S_{tx}$, is stored in a calibration signal storage buffer 162.

Calibration control processor 164 takes the transmit calibration signals from transmit signal storage buffer 162 and transmits them using antenna array 111 by way of the array transmit processor and duplexer. At the same time, calibration control processor 164 acquires the transponded version of the transmit calibration signals that are echoed by transponder 118. These echoed signals are the received calibration signals associated with the parameters of the test, including transponder location, frequency band, and polarization. Calibration control processor 164 then sends the received calibration signals to a calibration data processor 166. Calibration data processor 166 processes the received calibration signals to determine array calibration vectors to be stored in buffer 102. Calibration data processor 166 may remove the geometric component (due to transponder position) from the array calibration vector so that the value stored is a calibration vector referenced to a nominal or standard transponder position. In the preferred embodiment, the received calibration signals are digitized and calibration data processor 166 is implemented in software. Digitized received calibration signals will be referred to as received calibration data.

Figure 7:
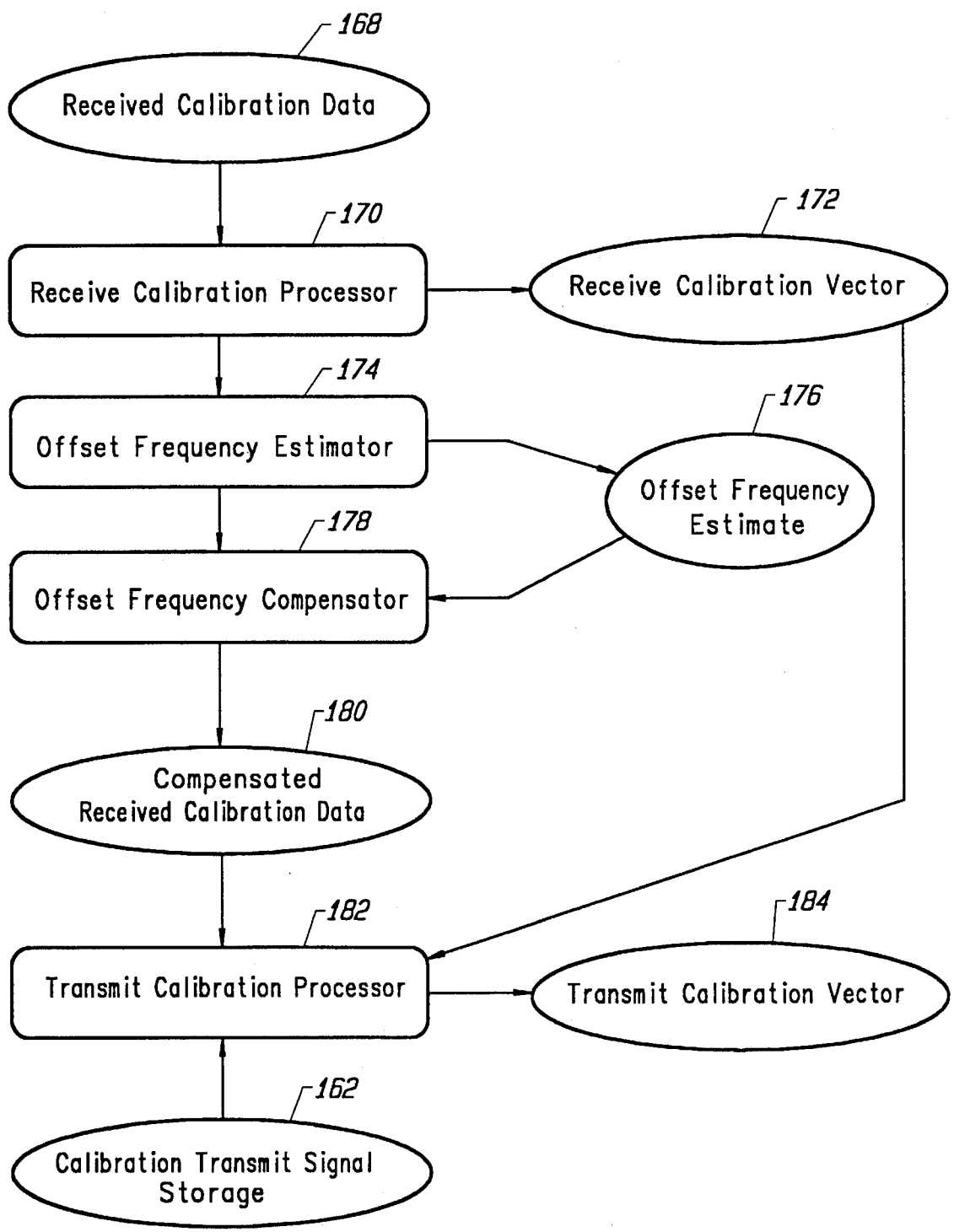
FIG. 7 is a functional block diagram of one embodiment of the calibration data processor in FIG. 6.

As shown in FIG. 7, calibration data processor operation starts with received calibration data 168 which is passed to receive calibration processor 170. Receive calibration processor 170 calculates receive calibration vector, $v_{rx}$ 172, which is the subset of the array calibration vectors introduced previously and used by receive signal processor 106. Receive calibration vector 172 is defined as the signals that would be seen from each element of antenna array 111 given a single, narrow band signal arriving from an external transmitter. It is receive calibration vector, $v_{rx}$ 172, that must be known for array receive signal processor 106 to receive expected antenna performance improvements during receive. To calculate receive calibration vector, $v_{rx}$ 172, receive calibration processor 170 first forms a receive data matrix from the digitized received calibration data 168. This matrix is a n by m matrix formed as $$S_{rx} = [S_{r1}, S_{r2}, \ldots S_{rm}] \quad (3)$$

where $S_{rx}$ is the receive data matrix and $S_{r1}$ through $S_{rm}$ is received calibration data 168 (the signals from antenna elements 1 through m, respectively). Receive calibration processor 170 next forms a received data covariance matrix defined as the conjugate of the product of the received data covariance with its own conjugate transpose.

$$R_{rx} = \overline{S_{rx}{}^H S_{rx}} \quad (4)$$

where $M^H$ indicates conjugate transpose of matrix M.

Receive calibration processor 170 then does an eigenvalue decomposition of $R_{rx}$ and finds receive calibration vector, $v_{rx}$ 172, which is the eigenvector corresponding to the largest eigenvalue, $\lambda_m$, of $R_{rx}$. Mathematically, $v_{rx}$ and $\lambda_m$ solve the equation:

$$R_{rx} v_{rx} = \lambda_m v_{rx}. \quad (5)$$

Equations (3), (4), and (5) represent only one of many possible methods for computing receive calibration vector 172 from received calibration data 168. Receive calibration processor 170 can be augmented to take advantage of system noise measurements, multiple experiments, and more data to provide increasingly accurate measurements of receive calibration vector 172.

Having determined the receive calibration vector 172 in receive calibration processor 170, the calibration data processor 166 now passes received calibration data 168 to frequency offset estimator 174. Frequency offset estimator 174 calculates a frequency offset 176 which is the difference in frequency between the calibration transmit signals and the calibration receive signals. This frequency offset comes from irregularities in the radio frequency oscillators used as references in transmit signal processor 104, receive signals processor 106, and transponder 118. The frequency offset estimator 174 can use the ESPRIT algorithm on the received calibration data 168, as disclosed in U.S. Pat. No. 4,750,147 and No. 4,965,732.

Alternatively, the calibration transmit signal synthesizer 160 can generate a different set of transmit signals. One example is to let $S_1(t)=1$ for all t and let $S_2, \ldots, S_m$ be zero signals. Then the received data $S_{r1}, \ldots, S_{rm}$ will contain a single sinusoid which can be simply analyzed to find frequency offset 176.

Next, the received calibration data 168 and frequency offset 176 are passed to frequency offset compensator 178 which removes the effects of frequency offset, $f_d$ 176, from received calibration data 168, producing compensated received calibration data, $\tilde{S}_{rx}$ 180, as shown in the formula:

$$\tilde{S}_{rx}(t,i) = S_{rx}(t,i) \exp(j 2\pi(-f_d/f_s)(t-1)), \quad (6)$$

where $f_s$ is the sampling frequency.

For the purpose of calculating the transmit calibration vector, it is necessary to estimate the round trip delay between the time the calibration control processor sends out the transmit signals and the time the calibration data processor starts collecting data. In equation (6), it is assumed that the received signal $S_{rx}$ has already been adjusted by the delay such that the first sample of $S_{rx}$ corresponds to the first sample of the transmitted signal $S_{tx}$.

Finally, the compensated received calibration data 180 is passed to transmit calibration processor 182 which calculates a transmit calibration vector, $v_{tx}$ 184. Transmit calibration vector 184 is the subset of the array calibration vectors introduced previously that is used by transmit signal processor 104. Transmit calibration vector 184 is defined as the relative phase and amplitudes with which identical signals transmitted through the m antenna array elements would arrive at a remote receiver at a particular location. It is transmit calibration vector 184 which is required by array transmit signal processor 104 to realize expected antenna array performance improvements during transmit.

As shown in FIG. 7, transmit calibration processor 182 takes as inputs compensated received calibration data, $\tilde{S}_{rx}$ 180, the contents of calibration signal storage buffer, $S_{tx}$ 162, and recently calculated receive calibration vector, $v_{rx}$ 172. Transmit calibration processor 182 then calculates transmit calibration vector, $v_{tx}$ 184, by performing the following operation:

$$v_{tx} = S_{tx}{}^\dagger \tilde{S}_{rx}(v_{rx}{}^T)^\dagger \quad (7)$$

where the symbol $\dagger$ indicates the pseudo-inverse operation and the symbol $T$ indicates transpose. Equation (7) represents only one of many possible methods for calculating transmit calibration vector 184 from compensated received calibration data 180. Transmit calibration processor 182 can be augmented to take advantage of multiple experiments, noise measurements, and more data to provide increasingly accurate array calibration vector measurements.

The apparatus and method in accordance with the invention provides many advantages over the prior art in that the only external equipment required is an inexpensive, easily portable transponder; both transmit and receive calibration can be determined in a single experiment; and the method self-corrects for reference frequency offsets in the antenna array system and thus is inherently accurate.

While the above description contains many specificities, these should not be construed as limitations on the scope of the invention, but rather as an exemplification of one preferred embodiment thereof. Many other variations are possible. For example, many different readily available electronics parts can be used to build the transponder. In addition, the specific calculations done by the calibration transmit signal synthesizer and the calibration data processor can be done in many ways using conventional technology. Accordingly, the scope of the invention should be determined not by the illustrated embodiments, but by the appended claims and their legal equivalents.

What is claimed is:

1. A calibration system for an RF signal transceiving system including an antenna array comprising an antenna array including a plurality of antennas for transmitting a first plurality of signals including individually identifiable signals and for receiving a second plurality of signals from a transponder signal, signal processing means for generating said first plurality of signals and for processing said second plurality of signals, means for applying said first plurality of signals to said antenna array, transponder means for receiving said first plurality of signals and in response thereto retransmitting said transponder signal to said antenna array, means for applying said second plurality of signals received from said antenna array to said signal processing means, said signal processing means comparing said second plurality of signals to determine receive calibration vectors, said signal processing means determining transmit calibration vectors by comparing said first plurality of signals and said second plurality of signals.

2. The calibration system as defined by claim 1 wherein said first plurality of signals are individually identifiable by frequency.

3. The calibration system as defined by claim 1 wherein said first plurality of signals are individually identifiable by time.

4. The calibration system as defined by claim 1 wherein said first plurality of signals are individually identifiable by a plurality of spreading functions.

5. The calibration system as defined by claim 1 wherein said transponder means retransmits said transponder signal in frequencies differing from frequencies of said first plurality of signals.

6. The calibration system as defined by claim 1 in which transponder means retransmits said transponder signal in time periods differing from time periods of said transmitted first plurality of signals.

7. The calibration system as defined by claim 1 wherein said transponder means retransmits said transponder signal using a spreading function which is different from a spreading function for said first plurality of signals.

8. The calibration system as defined by claim 1 wherein said signal processing means generates a receive calibration vector by first forming a receive data matrix from said second plurality of signals as follows:

$$S_{rx} = [S_{r1}, S_{r2}, \ldots S_{rm}]$$

where $S_{rx}$ is the receive data matrix and $S_{r1}$ through $S_{rm}$ are each of said second plurality of signals, forming a received data covariance matrix defined as the conjugate of the product of the received data covariance matrix with the conjugate transpose of said data covariance matrix as follows:

$$R_{rx} = \overline{S_{rx}^H S_{rx}}$$

where $M^H$ indicates conjugate transpose of matrix M and then performing an eigenvalue decomposition of $R_{rx}$ to determine a receive calibration vector, $v_{rx}$ in accordance with the following equation:

$$R_{rx} v_{rx} = \lambda_m v_{rx}$$

where $\lambda_m$ is the largest eigenvalue of $R_{rx}$ and $v_{rx}$ is a corresponding eigenvector.

9. The calibration system as defined by claim 1 wherein said antenna array includes a plurality of antennas each of which transmits and receives signals.

10. The calibration system as defined by claim 1 wherein said antenna array includes a first plurality of antennas for transmitting said first plurality of signals and a second plurality of antennas for receiving said second plurality of signals.

11. The calibration system as defined by claim 1 wherein said transponder means is located in a handset and said RF signal transceiving system comprises a cellular telephone transceiving system.

12. A calibration system for determining transmit calibration vectors for an antenna array in an RF transceiving system comprising an antenna array including a plurality of antennas for transmitting a first plurality of signals, signal generator means for generating said first plurality of signals including individually identifiable signals, means for applying said first plurality of signals to said antenna array, transponder means for receiving said plurality of signals and in response thereto retransmitting a transponder signal, antenna means for receiving said transponder signal, and signal processing means for processing said transponder signal, said signal processing means determining a transmit calibration vector by comparing said first plurality of signals and said transponder signal.

13. The calibration system as defined by claim 12 wherein said first plurality of signals are individually identifiable by frequency.

14. The calibration system as defined by claim 12 wherein said first plurality of signals are individually identifiable by time.

15. The calibration system as defined by claim 12 wherein said first plurality of signals are individually identifiable by a plurality of spreading functions.

16. The calibration system as defined by claim 12 wherein said transponder means retransmits said transponder signal in frequencies differing from frequencies of said first plurality of signals.

17. The calibration system as defined by claim 12 in which transponder means retransmits said transponder signal in time periods differing from time periods of said first plurality of signals.

18. The calibration system as defined by claim 12 wherein said transponder means retransmits said transponder signal using a spreading function which is different from a spreading function for said first plurality of signals.

19. A calibration system for determining receive calibration vectors for an antenna array in an RF receiver system comprising signal transmission means for generating and transmitting a transmission signal, transponder means for receiving said transmission signal and in response thereto retransmitting a transponder signal, an antenna array for receiving said transponder signal and producing a plurality of received signals, and signal processing means for comparing said plurality of received signals and producing receive calibration vectors for said antenna array.

20. A method of calibrating an RF transceiver system including an antenna array comprising the steps of:

transmitting a first plurality of signals from said antenna array, receiving said first plurality of signals with transponder means and retransmitting a transponder signal back to said antenna array, generating a receive calibration vector using said transponder signal as received by individual antenna elements, and generating transmit calibration vectors by comparing said first plurality of signals and said transponder signal as received by said individual antenna elements.

21. The method as defined by claim 20 wherein said step of transmitting includes individually identifying said first plurality of signals.

22. The method as defined by claim 21 wherein said step of transmitting includes individually identifying said first plurality of signals by frequency.

23. The method as defined by claim 21 wherein said step of transmitting includes individually identifying said first plurality of signals by time.

24. The method as defined by claim 21 wherein said step of transmitting includes individually identifying said first plurality of signals by means of a plurality of spreading functions.

25. The method as defined by claim 21 wherein said step of retransmitting said transponder signal includes frequency shifting the received first plurality of signals.

26. The method as defined by claim 21 wherein said step of retransmitting said transponder signal includes retransmitting the received first plurality of signals in a predetermined time slot.

27. The method as defined by claim 21 wherein said step of retransmitting said transponder signal includes changing spreading functions of the received plurality of signals.

28. A method of determining transmit calibration vectors for an antenna array in an RF transmission system comprising transmitting a first plurality of signals from said antenna array, said first plurality of signals including individual identifiable signals transmitted from individual antenna elements in said antenna array, receiving said first plurality of signals with transponder means and in response thereto retransmitting a transponder signal, receiving said transponder signal, and generating transmit calibration vectors by comparing said transponder signal and said first plurality of signals.

29. A method of determining receive calibration vectors for an antenna array in an RF receiver system comprising transmitting a first RF signal, receiving said first RF signal with transponder means and in response thereto retransmitting a transponder signal, receiving said transponder signal with said antenna array and producing a plurality of received signals, and comparing said plurality of received signals and producing receiver calibration vectors for said antenna array.

* * * * *